(12) United States Patent
Sorgius (10) Patent No.: US 10,644,410 B2
(45) Date of Patent: May 5, 2020

(54) CONTROL MODULE FOR A CAMERA IN A PRODUCTION SYSTEM AND METHOD FOR ACQUIRING IMAGES BY MEANS OF SUCH A CAMERA

(71) Applicant: Chromasens GmbH, Constance (DE)

(72) Inventor: Helmut Sorgius, Constance (DE)

(73) Assignee: Chromasens GmbH, Constance (DE)

( * ) Notice: Subject to any disclaimer, the term of this patent is extended or adjusted under 35 U.S.C. 154(b) by 0 days.

(21) Appl. No.: 15/566,345

(22) PCT Filed: Apr. 11, 2016

(86) PCT No.: PCT/EP2016/057933
§ 371 (c)(1),
(2) Date: Apr. 11, 2019

(87) PCT Pub. No.: WO2016/166062
PCT Pub. Date: Oct. 20, 2016

(65) Prior Publication Data
US 2019/0342481 A1    Nov. 7, 2019

(30) Foreign Application Priority Data

Apr. 14, 2015    (DE) .................. 10 2015 105 656

(51) Int. Cl.
| | | |
|---|---|---|
| *H01Q 21/06* | (2006.01) | |
| *H01Q 3/24* | (2006.01) | |
| *H04B 7/04* | (2017.01) | |
| *H04B 7/08* | (2006.01) | |

(52) U.S. Cl.
CPC .............. *H01Q 21/06* (2013.01); *H01Q 3/24* (2013.01); *H04B 7/04* (2013.01); *H04B 7/08* (2013.01)

(58) Field of Classification Search
None
See application file for complete search history.

(56) References Cited

U.S. PATENT DOCUMENTS

| 2008/0164430 A1 | 7/2008 | Diederichs |
| 2009/0080175 A1 | 3/2009 | Mizuno et al. |
| 2009/0201323 A1 | 8/2009 | Robert et al. |
| (Continued) | | |

FOREIGN PATENT DOCUMENTS

| CN | 103731606 | 4/2014 |
| DE | 102012101310 | 4/2013 |
| EP | 1727678 | 12/2006 |
| (Continued) | | |

OTHER PUBLICATIONS

Gardasoft Industrial LED technology, LED Light Controllers, Technology Overview, "The Practical use of LED Light Controllers within Machine Vision systems," Stemmer Imaging, Gardasoft Vision Limited (2013) (B-GARD06/2013) <www.stemmer-imaging.com> 13 pages.

(Continued)

*Primary Examiner* — James M Anderson, II
(74) *Attorney, Agent, or Firm* — HoustonHogle LLP (57) ABSTRACT

The invention relates to a control module for a camera and an illumination apparatus, a camera, a production system and a method for acquiring images by means of such a camera. The exposure times and illumination times are controlled on the basis of a common control clock signal. Due to this, beats can be avoided. This even applies if short flashes are executed at irregular times.

18 Claims, 4 Drawing Sheets

(56) References Cited

U.S. PATENT DOCUMENTS

2011/0310270 A1   12/2011   Gladnick et al.

FOREIGN PATENT DOCUMENTS

| WO | WO9511806   | 5/1995 |
|----|-------------|--------|
| WO | WO2013041216 | 3/2013 |

OTHER PUBLICATIONS

International Preliminary Report on Patentability with Annex, dated Jul. 7, 2017, from International Application No. PCT/EP2016/057933, filed on Apr. 11, 2016. X pages.
International Search Report of the International Searching Authority, dated Jul. 8, 2016, from International Application No. PCT/EP2016/057933, filed on Apr. 11, 2016. 7 pages.
Tietze, U. et al. "Halbleiter-Schaltungstechnik, 10. edition." 1993. pp. 561, 562, 585 and 586.

CONTROL MODULE FOR A CAMERA IN A PRODUCTION SYSTEM AND METHOD FOR ACQUIRING IMAGES BY MEANS OF SUCH A CAMERA

RELATED APPLICATIONS

This application is a § 371 National Phase Application of International Application No. PCT/EP2016/057933, filed on Apr. 11, 2016, which claims priority to German Application No. 10 2015 105 656.9, filed on Apr. 14, 2015, both of which are incorporated herein by reference in their entirety.

The present invention relates to a control module for a camera, a production system and a method for acquiring images by means of such a camera.

In production systems, products conveyed on a conveyor belt or strip-shaped products conveyed by a conveying device are often monitored by means of a camera. For this purpose, the production systems comprise a trigger signal generator which generates a trigger pulse after a predetermined distance has been covered. This trigger pulse is passed on to an illumination apparatus, wherein the illumination apparatus, on receiving such a trigger pulse, generates a flash and the camera, on receiving such a trigger pulse, receives the light reflected by the object to be inspected and converts it into image data. Such flash-actuated optical monitoring devices have found to be very useful in monitoring moving objects, because the movement is frozen by the flash illumination, and a sharp image of the object to be inspected can be acquired.

US 2009/0201323 A1 discloses an optical device for checking eggs. This device comprises an infrared light source and a video camera with a surface sensor. The infrared light source is formed from a plurality of light-emitting diodes. A control and analysis device is provided for controlling both the light source and the video camera and for evaluating the acquired images. Different exposure processes are provided to illuminate the eggs for different periods of time in order to examine different aspects. 100 µs, 1 µs and 4 µs are specified as exemplary illumination times. The control module can output synchronized command signals for the video camera and a specific light-emitting diode to be selected.

WO 95/11806 A1 discloses an optical scanning device for monitoring the ink applied to a recording medium in a printing machine. This optical scanning device comprises a xenon photoflash tube.

This photoflash tube should preferably flash if a camera with a surface sensor is switched to sensitive. In order to achieve this, the photoflash tube is synchronized to the camera, not the camera to the photoflash tube as in conventional systems.

US 2009/0080175 A1 describes an endoscope comprising three light-emitting diodes in the colors red, green and blue as light source. This endoscope is provided with a CCD sensor with which images of the areas illuminated by the light-emitting diodes can be recorded. A dimmer circuit is provided for adjusting the brightness of the light-emitting diodes. A timing controller is provided with which the control signals for the light-emitting diodes and the control signals for the CCD surface sensor can be output synchronously.

From the advertising brochure Gardasoft, Industrial LED Technology, LED Light Controllers, Technology Overview, Stemmer Imaging, B-GARD06/2013, a driver unit for an illumination apparatus comprising light-emitting diodes as illumination means is known, with which device various different light signals can be generated on receiving a trigger pulse. These different signals can be output by one or more of the light sources. With this driver unit, a trigger signal for a camera can be generated as well. The driver unit is also designed to receive a trigger signal of a conveying device. In principle, this driver unit should be capable of outputting short light pulses with a minimum illumination time of 1 µs. This driver unit generates an internal trigger signal with a sequence of evenly spaced trigger pulses, a predetermined illumination process being executed at each internal trigger pulse.

In fast-running production systems, the use of such a driver unit for controlling an illumination apparatus involves various problems.

On the one hand, it has been found that the brightness received with the camera often varies greatly if the light pulses are short. This makes a reliable evaluation of the acquired images difficult.

On the other hand, in particular if different illumination times and/or exposure times are used, pauses of different lengths have to be provided between the individual illumination processes, because the spacing of the trigger pulses has to be adjusted such that there is enough time for the longest exposure process between two consecutive trigger pulses. As a result, it is not always possible to execute all desired illumination processes within two consecutive internal trigger pulses.

The invention is based on the problem of creating a control module for a camera, a camera, a production system and a method for acquiring images by means of such a camera whereby some or all of the problems explained above are overcome.

The invention is in particular based on the problem of creating a control module for a camera, a camera, a production system and a method for acquiring images by means of such a camera whereby images with a desired predetermined brightness can be acquired even at short pulses.

The invention is further based on the problem of creating a control module for a camera, a camera, a production system or a method for acquiring images by means of such a camera whereby an exposure sequence of different predetermined exposure processes can be executed very fast.

One or more of the above problems is/are solved by the subject matter specified in the independent claims. Advantageous variants of the invention are specified in the dependent claims.

According to a first aspect, the invention relates to a control module for a camera and at least one illumination apparatus controlled with a switching controller. The control module is designed for controlling the exposure times and for reading out pixels of a digital optical sensor of the camera and for controlling at least the illumination time of the at least one illumination apparatus, wherein the control module can be designed for the repeated execution of an exposure sequence with different predetermined exposure processes. The control module comprises a control clock generator for generating a control clock signal. The control module comprises an interface where the control clock signal is made available for transfer to the switching controller of the illumination apparatus, so that the switching controller is clocked with the control clock signal of the control module and the exposure time can be controlled synchronously with the control clock signal.

With this control module, the exposure time is therefore controlled synchronously with the control clock signal, and the control clock signal is provided for the switching controller of the illumination apparatus. As the switching controller is actuated with the control clock signal, a control current output by the switching controller is likewise synchronous with the control clock signal.

As a result, there are no beats resulting in unintentional brightness fluctuations between a control signal which controls the illumination time and a control current generated by the switching controller.

Many illumination apparatuses, in particular illumination apparatuses using light-emitting diodes as illumination means, are current-controlled. Owing to the fact that the end resistance varies greatly as a result of using light-emitting diodes as illumination means, a voltage-controlled operation is disadvantageous, because the current supplied in this way can change considerably and in particular in an uncontrolled manner. Control by means of a switching controller facilitates the precise control of the current. The inventor has found that, in conventional illumination apparatuses in which switching controllers are used in order to control a light source with a defined amperage and in which short illumination times are used, there is a risk of beats if the illumination or pulse times for controlling the light source and the camera are so short that they are of a similar order of magnitude as the clocking of the switching controller. As, according to the invention, the control module of the camera makes the control dock signal available for the switching controller of the illumination apparatus, the switching controller can generate a control current in synchrony with the predetermined illumination time and the corresponding exposure time(s) without the risk of beats. This will be explained in greater detail below.

According to a second aspect, the invention relates to a control module for a camera and at least one illumination apparatus. The control module is designed for controlling the exposure times and for reading out pixels of a digital optical sensor of the camera and for controlling at least the illumination time of the at least one illumination apparatus, wherein the control module can be designed for the repeated execution of an exposure sequence with different predetermined exposure processes. The control module is designed such that each exposure process comprises the control of the at least one illumination apparatus for a specified illumination time and the control of the exposure of the optical sensor for a specified exposure time.

The control module according to the invention therefore controls both the illumination time of the illumination apparatus and the exposure time of the optical sensor for all exposure processes of the exposure sequence. This allows pauses between the individual exposure processes to be adjusted individually and therefore to be shortened compared to conventional illumination apparatuses.

The control module can be designed such that the exposure time is synchronous with the control dock signal as well.

A signal is synchronous with the control clock signal if a corresponding pulse of the respective signal starts or ends simultaneously with an edge of the control clock signal. In this way, the pulses of the signals are rasterized or quantized according to the pulses of the control clock signal.

In an exposure process, both the start and the end of the exposure and the start and the end of the illumination are controlled by a control signal having a corresponding control pulse and being synchronous with the control clock signal. The same control clock signal is preferably used both for controlling the exposure and for controlling the illumination.

In conventional control modules for executing an exposure sequence of several exposure processes, although the start and the end of the exposure times and of the illumination times are predetermined by the control module, the exposure times and the illumination times are not switched by the control module itself with a switching controller, but by the respective camera or the respective illumination apparatus. As, according to the invention, the control module predetermines the control dock signal for controlling the illumination times and the exposure times, there is no risk of beats. This predetermination of the control clock signal, which is used for controlling both the illumination time and the exposure time, ensures that the illumination times and the exposure times are controlled in a precisely synchronous manner. The term "precisely synchronous" does not necessarily mean that the illumination times and the exposure times start and end at precisely the same point in time, but that the start and the end of the illumination times and the exposure times are always chronologically spaced in a predetermined way, so that no beats can occur. The chronological spacing between the start of the illumination time and the exposure time and the end of the illumination time and the exposure time can be "0" but does not have to be "0".

In this way, it is possible to execute complex exposure sequences with different exposure processes, wherein the duration of the illumination and the exposure intervals are always synchronous and the brightnesses detected by the optical sensor are essentially influenced by the objects to be scanned only and not by beats due to the control unit.

With the control module according to the invention, even exposure times and illumination times of a duration of only a few control cycles can be controlled reliably.

As the illumination times can be adjusted very precisely with the control module, the control current fed to the illumination apparatuses can constantly be held at a defined value, so that the illumination apparatus can be operated at an optimum operating point. This is particularly advantageous if the illumination apparatus uses light-emitting diodes as illumination means.

The control clock signal preferably has a frequency of at least 100 kHz and in particular of at least 500 kHz.

The control module can have a trigger interface for an external trigger signal, with an exposure sequence being executed each time on receiving an external trigger pulse. An external trigger pulse therefore initiates a complete exposure sequence comprising a plurality of exposure processes. By synchronizing the illumination time with the control clock signal, it is ensured that no beats occur. This also applies to external trigger pulses fed to the control module with variable spacing, as is the case if one or more of the objects to be scanned is/are moved along the illumination apparatus at different speeds.

The control module preferably comprises a trigger generator for generating an internal trigger signal. The internal trigger signal comprises sequences of several internal trigger pulses. Each internal trigger pulse triggers one of the exposure processes of the exposure sequence. The trigger generator is designed such that the internal trigger pulses can be generated with different spacing.

If trigger pulses with different spacing were generated in conventional control modules, the exposure times of which are not synchronized with the control signal, this would result in additional beats, in particular if line cameras are used. As the illumination times are synchronized with the control clock signal with which the switching controller is actuated for controlling the illumination apparatus, the trigger pulses can be arranged chronologically in such a way that the individual illumination processes are executed at minimum time intervals. This facilitates a quick repetition of exposure sequences with several different exposure processes and/or a corresponding number of exposure processes within an exposure sequence. Conventional systems are subject to restrictions in the repetition rate of the exposure sequences on the one hand and in the number of exposure processes within an exposure sequence on the other hand. In conventional control modules for controlling an exposure sequence, the individual trigger pulses are spaced evenly. The spacing between consecutive trigger pulses corresponds at least to the exposure process of the longest duration. As a result, the overall exposure sequence takes a long time, which makes it difficult to scan an object with closely spaced lines while at the same time moving the object along the illumination apparatus at high speed.

The control module is preferably a part of the camera and has an interface for delivering the control clock signal to the illumination apparatus. In principle, it would be possible for the control clock signal to be generated either in the camera or in the illumination apparatus for delivery to the respective other device in order to synchronize the illumination time and/or the corresponding control signal with the control clock signal.

The exposure times are preferably also synchronized with the control clock signal. For this purpose, the control clock signal is generated by a single signal generator and made available to the illumination apparatus and to the camera accordingly. For the control of the exposure times and the illumination times, the control clock signal can alternatively be generated by two signal generators, one for controlling the exposure times and the other for controlling the illumination times, as long as the two signal generators are synchronized. Basically, however, it is simpler to use only a single signal generator.

A camera has an internal clock generator as a rule. The control clock signal does, however, not have to be identical with the clock signal of the internal clock generator. As the control clock signal is used for controlling the illumination time as well, it may be expedient to use a clock signal having a lower frequency than an internal clock signal of a camera as a control clock signal, because a lower frequency is often easier to handle and can be transmitted to another device, e.g. the illumination apparatus, more easily.

The digital optical sensor is preferably designed as a line sensor. In the use of a line sensor, each line represents a separately exposed image, which is why the number of images which can be acquired is considerably higher than with an area camera. As a result, the individual images have to be exposed with a considerably higher frequency when using a line camera than when using an area camera.

When using a line camera, considerably more is therefore required from an illumination apparatus, because the illumination times have to be adjusted to the very short exposure times of a line camera.

A production system with a conveying device whereby a strip-shaped product or a plurality of products is conveyed on the conveying device is provided with a control module as described above, a camera and an illumination apparatus. The conveying device comprises a trigger signal generator which generates an external trigger signal. Each external trigger signal has a trigger pulse whenever the conveying device has covered a predetermined distance.

By using this control module, the conveying device can operate at a high speed while complex exposure sequences can nevertheless be executed on the occurrence of each external trigger pulse. With this control module, the conveying device can furthermore be moved at greatly varying speeds without beats occurring in the illumination process if the speed is varied. At high conveying speeds, a close scanning of the object is ensured owing to the short duration of the exposure sequence.

The illumination apparatus preferably comprises light-emitting diodes as illumination means.

In a method according to the invention for acquiring images by means of a camera with a control module as explained above, several exposure sequences, each with predetermined different exposure processes, are executed repeatedly, wherein in each exposure process both an illumination apparatus for illuminating an object for a defined illumination time and an optical sensor for receiving light reflected by an object for a defined exposure time are controlled by the control module.

The illumination time and the exposure time are preferably executed in synchrony with a common control dock signal.

The exposure time and/or the illumination time of at least one of the exposure processes is/are preferably no longer than 20 times an individual cycle of the control signal.

On receipt of each external trigger pulse, a complete exposure sequence can be executed automatically.

The exposure sequences are preferably executed with predetermined exposure processes of different length, wherein the individual exposure processes can start at irregular points in time, i.e. they do not have to be spaced evenly.

The method is preferably designed such that during an exposure process both the illumination time and the exposure time are controlled by the control module and that both are synchronized with the control clock signal in particular and that the sensor is read out in the subsequent exposure process. The minimum duration of an exposure process is determined by the required readout time of the sensor, which is always of equal length. The exposure time and the illumination time, on the other hand, can be chosen freely. The exposure time and the illumination time are preferably the same in each case and are controlled by the same control signal.

The invention is explained in greater detail below by way of example with reference to the drawings, of which.

Figure 1:
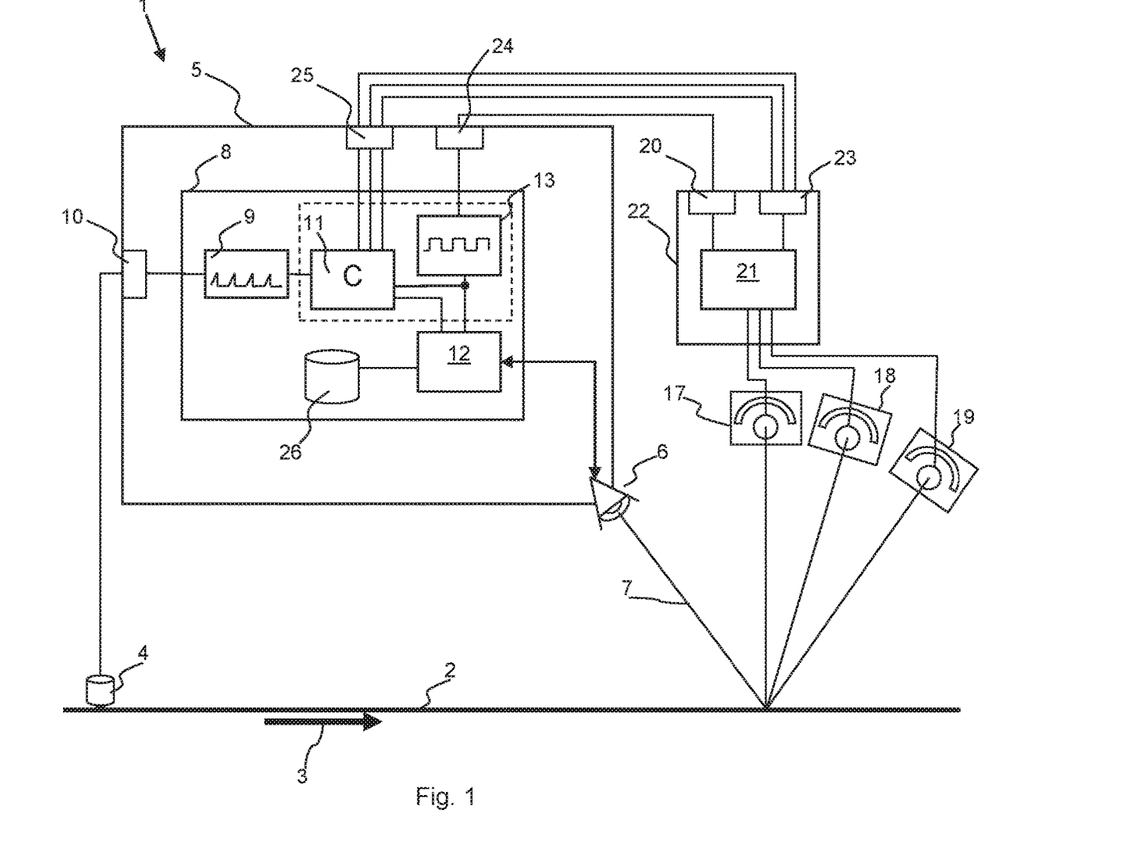
FIG. 1 is a block diagram of a section of a production system with a conveying device, a light source and a camera for monitoring a strip-shaped product.

FIG. 1 is a block diagram of a section of a production system 1 with a strip-shaped product 2, which is moved in the conveying direction 2 in the production process. The product 2 is a printed paper web of a printing apparatus, for example.

An encoder 4 with a roller is coupled to the web product; this generates a trigger pulse if the strip-shaped product 2 moves a predetermined distance. The trigger pulses of the encoder 4 are hereinafter described as external trigger pulses.

The production system 1 comprises a camera 5. The camera 5 comprises a line sensor 6 for detecting light 7 reflected from the product 2.

The camera comprises a control module 8, by means of which the exposure time of the camera, during which the line sensor 6 is switched to light-sensitive, is controlled and the pixel values detected with the line sensor 6 are read out.

The control module 8 comprises an internal trigger generator 9, which is connected to an interface 10 of the camera 5 to which the encoder 4 is connected via a data line, so that the internal trigger generator 9 receives the external trigger pulses of the encoder 4.

The internal trigger generator 9 is designed such that a series of internal trigger pulses is generated on receipt of an external trigger pulse. The internal trigger pulses can have different chronological spacing.

Figure 2A:
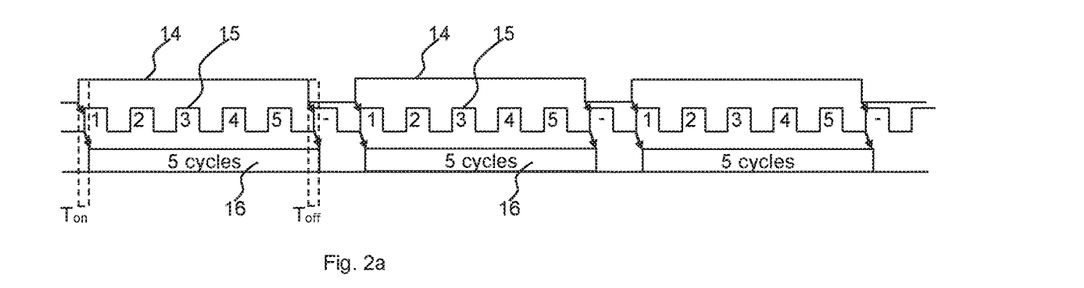
FIG. 2*a* shows a control signal, a control clock signal and a switching signal according to the present invention.

The internal trigger generator 9 is connected to a control pulse controller 11. The control pulse controller 11 generates a control signal 14 (FIG. 2a). The control signal 14 comprises control pulses, each control pulse being assigned to a trigger pulse. Each control pulse of the control signal 14 corresponds to an illumination time. In the present embodiment, a control pulse corresponds to an exposure time as well, i.e. the start and the end of the illumination time and the exposure time are controlled by each control pulse.

The control pulse controller 11 is connected to a clock generator 13. The clock generator 13 generates clock signals 15, which are fed to the control pulse controller 11.

The control pulses of the control signal 14 are synchronized with the control clock signal 15 and/or the pulses contained therein, i.e. an edge of a control pulse of the control signal 14 corresponds to an edge of a pulse of the control clock signal 15. The control pulses of the control signal 14 are therefore rasterized in accordance with the edges of the clock signal 15.

The control pulse controller 11 is connected to a switching device 12. The switching device 12 also receives the control clock signals 15 from the clock generator 13. The switching device 12 is a clock generator which switches on the exposure unit at the line sensor 6 in accordance with the control signal 14 and in accordance with the clock signals 15 of the clock generator 13 (FIG. 2a).

The production system 1 comprises three light sources 17, 18, 19. The three light sources 17, 18, 19 are connected to a light source control unit 20. The light source control unit 20 comprises a light source switching device 21 and a first and a second interface 22, 23. The light source switching device has a switching controller for supplying the individual light sources 17, 18, 19 with a predetermined current. The current is controlled by the switching controller independently of the internal resistance of the respective load, which is why such a power supply is particularly suitable for light sources having light-emitting diodes. A corresponding first interface 24 and a second interface 25 are provided on the camera 5. The clock generator 13 is coupled to the first interface 24 of the camera 5. The first interface 24 of the camera 5 is connected to the first interface 22 of the light source control unit 20, so that the clock signal is delivered from the clock generator 13 to the light source switching device 21. The switching controller is actuated with this clock signal, i.e. the switching controller uses this clock signal as an internal control clock. Via the second interfaces 23, 25, the control signal 14 of the control pulse controller 11 is delivered to the light source switching device 21, with a separate line leading from the control pulse controller 11 to the light source switching device 21 for each of the light sources 17-19. In the present embodiment, three light sources 17-19 and thus three separate lines are provided. Each of these lines is assigned to one of the light sources 17-19. In the light source switching device 21, the inputs of the control pulses are switched in the same way as in the switching device 12 of the camera 5 by means of the clock signal 15 transmitted in parallel, wherein in any case at least one of the light sources 17-19 is switched on.

A switching signal 16 for activating one of the light sources 17, 18, 19 is switched on or off whenever the state of the control signal 14 differs from the state of the switching signal 16 while there is a positive-going edge of the control dock signal 15. In other words: if the control signal 14 is on and the switching signal 16 is off, the switching signal 16 is switched on at the next positive-going edge of the control clock signal 15. If the control signal 14 is off and the switching signal 16 is on, the switching signal is switched off at the next positive-going edge of the control clock signal 15. The switching signal therefore always follows the control signal at the next positive-going edge of the control dock signal 15. In each case, there is a time delay between the edges of the control signal 14 and the edges of the switching signal; this is identified in FIG. 2a as $T_{on}$ and $T_{off}$ respectively.

The duration of the pulses of the switching signal 16 is clocked with the cycles of the control clock signal 15, i.e. the pulses of the switching signal 16 are quantized according to the cycles of the control clock signal 15.

The switching signal 16 is adjusted to a defined current value by means of the switching device 12 designed as switching controller. As a result, the light sources 17-19 are operated with a defined current which is preferably adjusted such that the light sources are activated at their optimum operating point.

In the present embodiment, the control signal 14 generated by the control pulse controller 11 is identical for the exposure time of the line sensor 6 and the illumination time of the light sources 17-19. The control pulse controller 11 can simultaneously apply a control pulse to one or more of the three lines leading to the light source control unit 20, so that one or more of the light sources 17-19 is/are switched on simultaneously. If fluorescence effects are to be observed, for example, it can make sense to provide different control signals for the line sensor 6 and the light sources 17-19, so that the line sensor 6 is still activated while all light sources are already switched off and therefore dark.

In principle, it is also possible to provide separate control pulse controllers 11 in the camera 5 and the light source control unit 20, in which case the internal trigger pulses of the internal trigger generator 9 have to be fed to both control pulse controllers.

In most cases each internal trigger pulse triggers an exposure time during which the line sensor 6 is activated and an illumination time during which at least one the light sources 17-19 is on. In the detection of fluorescence effects, it is possible to trigger only an illumination time with one trigger pulse and only an exposure time with a subsequent trigger pulse. The light signals detected by the line sensor 6 are converted into electric signals by the line sensor 6, wherein pixels of the line sensor are read out individually and the corresponding pixel values are stored in a storage device 26. The storage device 26 as a rule only has a low storage capacity for some or a few line images. The content of the storage device is usually immediately transferred to an evaluation device, which is a computer as a rule.

The pixels of the line sensor are read out after the end of the exposure time, so that the readout as a rule at least partially overlaps chronologically with the exposure time of the following exposure process.

As the same clock signal 15 is used for controlling both the line sensor 6 and the light sources 17-19, the illumination times and the exposure times are always synchronous. In conventional exposure devices, the light source control unit has its own internal clock generator, which is independent of the clock generator of the camera.

Figure 2B:
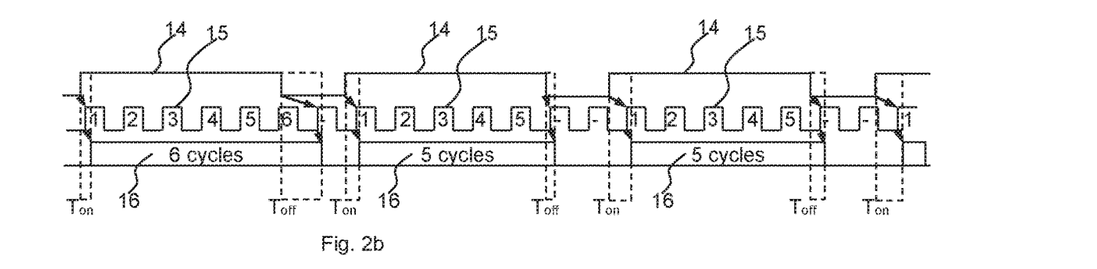
FIG. 2*b* shows a control signal, a control clock signal and a switching signal according to prior art, FIG. 3*a* diagrammatically shows the sequence of exposure processes of an exposure sequence according to the present invention, FIG. 3*b* diagrammatically shows the sequence of exposure processes of an exposure sequence according to prior art.

FIG. 2b shows a control signal 14 with consecutive control pulses of equal length, wherein the light source is switched on for six cycles at the first control pulse and for only five cycles at subsequent control pulses. As a result, differences in brightness are generated. These differences in brightness are exclusively caused by beats between the control signal 14 and the switching signal 16.

In conventional control units, beats can also occur between the illumination time and the exposure time if non-synchronized clock signals are used for controlling the light sources and the sensor. As in the present embodiment the same control signal 15 is used both in the camera 5 and in the light source control unit 20, such differences in the exposure times and the illumination times are avoided.

Figure 3A:
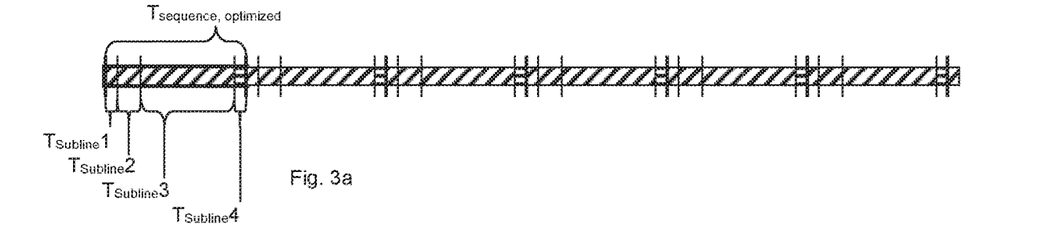
Figure 3B:
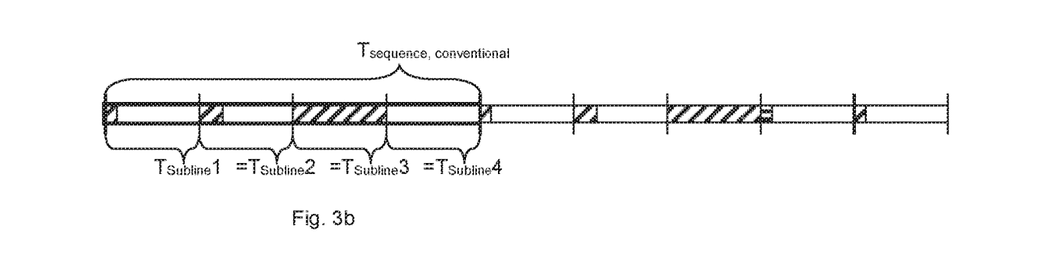

In conventional illumination apparatuses, in which an exposure sequence with several consecutive different exposure processes is to be executed, the individual exposure processes are always started on the expiry of a time interval which corresponds at least to the maximum illumination time during the exposure sequence (FIG. 3b). The total time $T_{Sequenz,\ konventionell}$ required for the exposure sequence therefore corresponds to the number of exposure processes multiplied by the duration of the maximum illumination time.

In the present embodiment, the individual exposure processes can be started in an irregular sequence and executed immediately consecutively. The total duration of an exposure sequence $T_{Sequenz,\ optimiert}$ therefore amounts to the sum of the durations of the individual illumination times and is therefore considerably shorter. In this context, it has to be considered, however, that an exposure process takes at least as long as the minimum readout time, even if the illumination time of the respective exposure process is shorter, because no further exposure process can be started before a readout process is finished.

In conventional illumination apparatuses, an irregular start of the illumination times carries the risk of additional beats. As the control pulses 14 and the clock signals of both the camera 5 and the light source control unit 20 are mutually synchronous in the present embodiment, there is no risk of beats. As a result, the scanning of a strip-shaped product with a complex exposure sequence is accelerated considerably, and quality is improved compared to conventional methods, because there are no differences in brightness caused by beats. As the total time of an exposure sequence is considerably reduced, the web speed with which the product 2 is moved in the conveying direction 3 or the resolution with which the object is depicted is increased compared to conventional methods.

Figure 4:
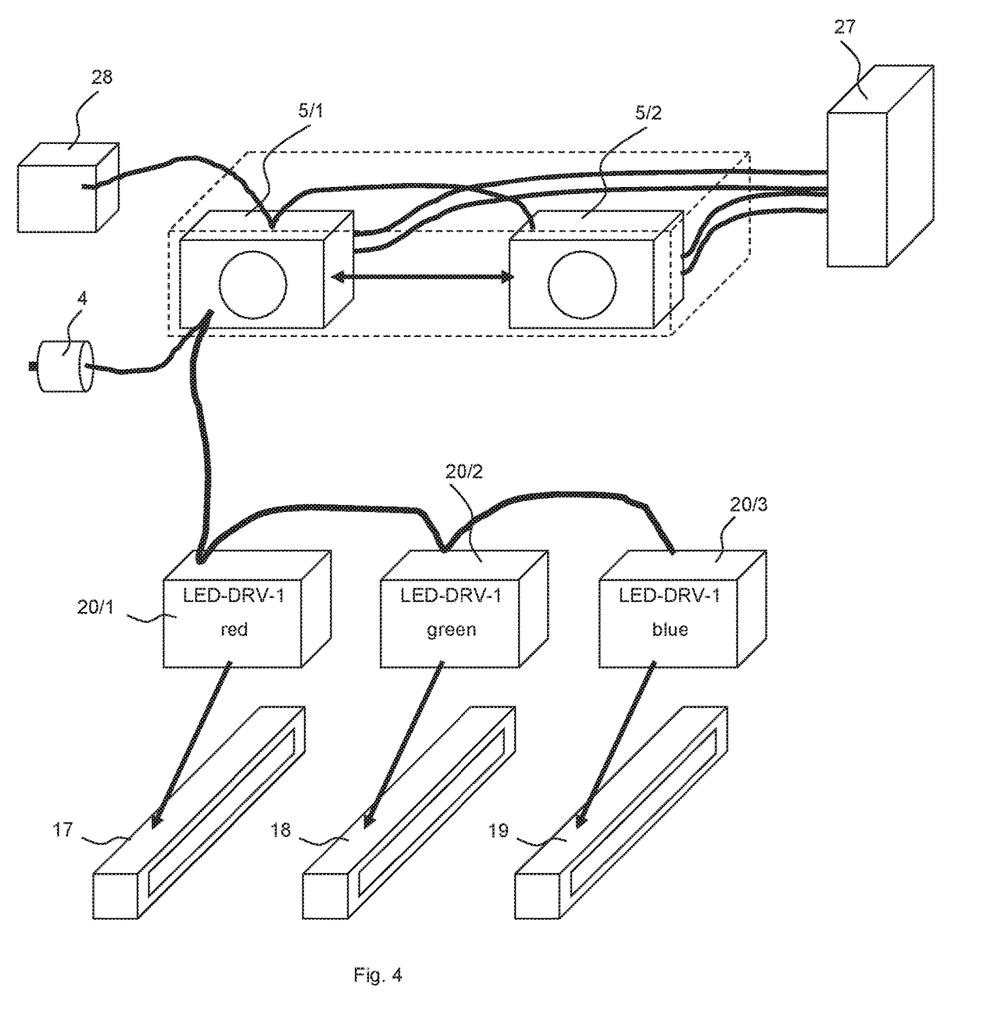
FIG. 4 is a block diagram of a monitoring device with a camera according to the invention.

FIG. 4 shows an embodiment in which a master camera 5/1 and a slave camera 5/2 are provided. Each of the two cameras 5/1 and 5/2 has a separate line sensor. The master camera 5/1 comprises a control module which corresponds to the control module 8 from FIG. 1. The slave camera 5/2 comprises at least one switching device which receives both the clock signal and the control pulses from the master camera. The two cameras 5/1 and 5/2 are connected to a computer 27, which receives the image signals recorded by the two cameras.

The cameras 5/1 and 5/2 are connected to a common power supply.

The master camera 5/1 is connected to an encoder 4 for receiving external trigger signals. The master camera 5/1 is furthermore connected to three light source control units 20/1, 20/2, 20/3, each of which controls a light source. In the present embodiment, these light sources are cellular light sources 17, 18, 19 with light-emitting diodes as illumination means. The light sources are provided with light-emitting diodes of the colors red, green and blue. With these three light sources, the shade with which a product to be scanned is illuminated can be adjusted individually by superimposing light of the individual light sources with different intensity.

Figure 5A:
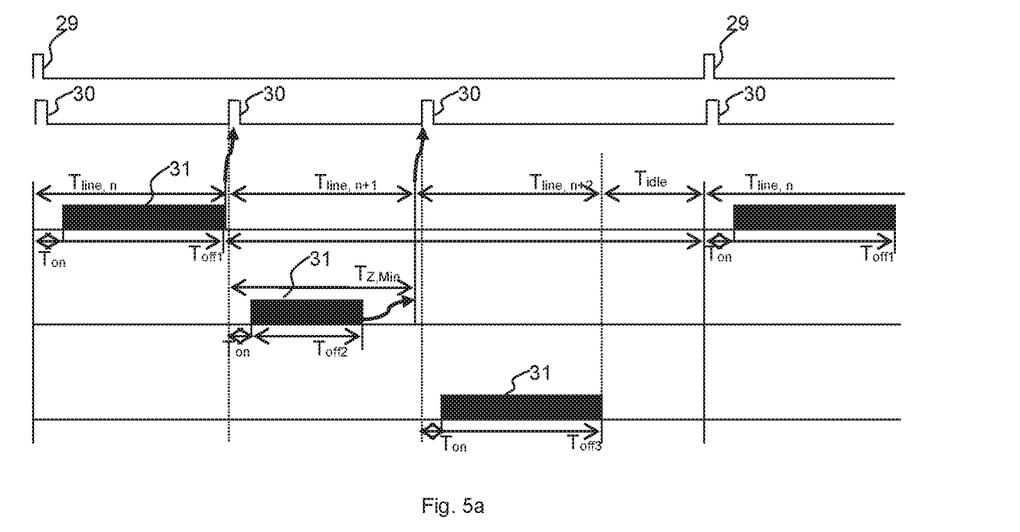
FIG. 5*a* is a timing diagram of an example of an exposure sequence.
Figure 5B:
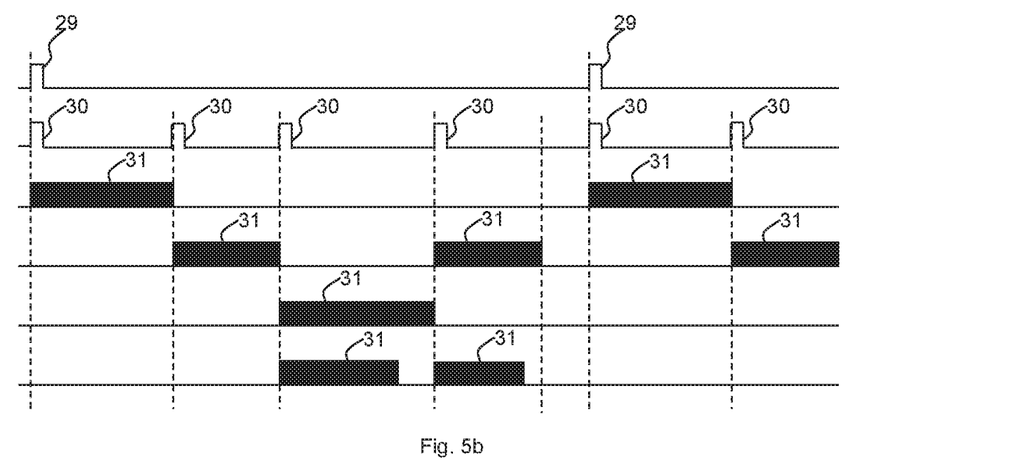
FIG. 5*b* is a timing diagram of a further example of an exposure sequence.

FIG. 5b shows in a diagram an example for how this monitoring system can be operated for a sequential R-B-G flash operation. At each external trigger pulse 29, a sequence of internal trigger pulses 30 is generated. The exposure times and the illumination times are in each case indicated by a bar in the respective lines for the first, second or third flash operation. The illumination times and the exposure times are in each case substantially identical. It may be expedient to provide minor offsets at the start and at the end of the respective times in order to compensate for different on-times and/or different off-times. It should further be noted that the exposure times and the illumination times can be shorter than a minimum readout time $T_{Z\ Min}$ required for reading out the sensor, in particular the line sensor. This in particular applies to line sensors which have to be read out sequentially, such as CCD sensors. In the example shown in FIG. 5, the second flash operation is shorter than the minimum readout time. The minimum spacing of two consecutive internal trigger pulses therefore corresponds to the minimum readout time.

The third flash operation is followed by an idle time $T_{idle}$, until the next external trigger pulse 29 is received. This idle time permits a change of the speed at which the product web is moved. The web speed can be increased until the idle time is "zero".

FIG. 5b shows a further embodiment of an exposure sequence with a total of four consecutive internal trigger signals 30 and accordingly four exposure processes. In the third and the fourth exposure process, two flash operations 31 are executed with two different light sources each. In the present embodiment, these flash operations are of different lengths.

The control module according to the invention facilitates the control of highly different exposure sequences with different complex illumination patterns of bright field, dark field and/or transmitted light illumination and/or with different color combinations.

The duration of an individual flash operation can be between a few microseconds and some hundred milliseconds. The minimum flash duration is predetermined by the control clock signal, the minimum flash duration corresponding to a cycle of the control clock signal. The higher the clock frequency, the shorter the minimum flash duration can be.

The individual flash operations generate sub-lines which can be processed in different ways. Examples for this are HDR (high dynamic range) images and differential images.

HDR images are generated by reckoning up sub-lines which have been exposed for different lengths of time to produce a single output line. This output line than has a higher dynamic than the respective individual lines. This at the same time results in an information compression into the frame width available for output, which is 8 bits per channel as a rule. Following transmission for display/processing, this can once again be re-linearized, so that the image can be displayed on a screen.

In order to make certain effects of the objects to be scanned better visible, the sub-lines exposed in different ways can be reckoned up together. The difference of two sub-lines can be formed, for example.

A bright field illumination and a dark field illumination can also be provided as a light source. In this way, brilliance fractions in the objects to be monitored can be separated. For this purpose, it may be expedient to form the difference of lines generated with a bright field illumination from lines generated with a dark field illumination.

In the embodiment shown in FIG. 1, the camera has a single line sensor. Within the scope of the invention, it is obviously also possible to provide one or more cameras with one line sensor or several line sensors each. When using several line sensors, in particular, it is possible to use those which are specific to certain colors. The line sensors are preferably specific to primary colors such as red, green and blue.

It is furthermore possible in principle to provide both in the camera and in the light source control unit separate internal trigger generators, each of them controlling a control pulse controller, as long as a common clock signal is used, the control pulse controller being preferably also controlled by the common clock signal. This, too, maintains the synchronicity of the control pulses with the exposure times and the illumination times.

Conventional cameras and light source control units or light source drivers as a rule comprise a clock generator which provides an internal clock signal. For the invention, it may be expedient to provide a clock signal which differs therefrom in its frequency and has a frequency which is lower as a rule than that of the internal clock signal of the camera or the light source control unit.

In this way, the clock signal can be transmitted more easily from the camera to the light source control unit or vice versa. The control clock signal according to the invention can, for example, be generated by means of a frequency divider from an internal clock signal of a camera or of a light source control unit.

Within the scope of the invention, it is also possible to generate the inventive common control clock signal in the camera or the light source control unit and to generate the control pulse by means of a control pulse controller in the respective other device.

In principle, it is also possible to provide a control module which receives the external trigger signals and generates the control signal as a function of the external trigger signals outside the camera and the light source control unit. This external control module should, however, likewise receive the common control clock signal or generate it itself and deliver it to the camera and the light source control unit.

The control module can also be provided in the light source control unit, in which case the common control clock signal likewise has to be delivered from the light source control unit to the camera, so that the exposure time can be switched using the common control dock signal.

With the control module according to the invention and/or with the camera according to the invention, system speeds and image qualities which are considerably higher than in the methods commonly used up to now are achieved.

By controlling the exposure sequences by means of the control module according to the invention, which is preferably located in a camera, the exposure sequences are always image-synchronous. In conventional systems, this can only be achieved at great expense, if at all.

In conventional systems, the light source control units are operated asynchronously relative to the cameras. This results in beats in brightness, particularly at short illumination times. These beats are avoided by the invention.

The system can easily be extended with a master camera and one or more slave cameras, all cameras being 100% synchronous. The cameras are preferably cell cameras.

The invention can be summarized briefly as follows:

The invention relates to a control module for a camera and an illumination apparatus, a camera, a production system and a method for acquiring images by means of such a camera.

The exposure times and the illumination times are controlled on the basis of a common control clock signal. In this way, beats can be avoided. This even applies if short flash operations are executed at irregular points in time.

USE OF REFERENCE NUMBERS

1 Production system
2 Product
3 Conveying direction
4 Encoder
5 Camera
6 Line sensor
7 Reflected light
8 Control module
9 Internal trigger generator
10 Interface
11 Control pulse controller
12 Switching device
13 Clock generator
14 Control signal
15 Control clock signal
16 Switching signal
17 Light source
18 Light source
19 Light source
20 Light source control unit
21 Light source switching device
22 First interface
23 Second interface
24 First interface
25 Second interface
26 Storage device in PC
27 Computer
28 Power supply
29 External trigger pulse
30 Internal trigger pulse
31 Flash operation

The invention claimed is:

1. Control module for a camera and at least one illumination apparatus controlled by a switching controller, wherein the switching controller supplies the illumination apparatus with a predetermined current and the control module is designed to control the exposure times and to read out pixels of a digital optical sensor of the camera and to control the illumination time of the at least one illumination apparatus and comprises a control clock generator for generating a control clock signal, wherein the control module comprises an interface where the control clock signal is made available for delivery to the switching controller of the illumination apparatus, so that the switching controller is clocked with the control clock signal of the control module and the illumination time can be controlled in synchrony with the control clock signal, wherein the control module comprises a trigger generator for generating an internal trigger signal, wherein the internal trigger signal comprises sequences of several internal trigger pulses, wherein each trigger pulse triggers an exposure process of an exposure sequence and the trigger generator is designed such that internal trigger pulses with different spacing can be generated, the control module being a part of the camera and having an interface for transferring the internal trigger signal to the illumination apparatus.

2. Control module according to claim 1, wherein the control module is designed such that each exposure process comprises the control of the at least one illumination apparatus for a defined illumination time and the control of exposure of the digital optical sensor for a defined exposure time.

3. Control module according to claim 1, wherein the control module is designed for the repeated execution of an exposure sequence with predetermined different exposure processes.

4. Control module according to claim 1, wherein the control module is designed such that during an exposure process the start and the end of both exposure of the digital optical sensor and illumination of the illumination apparatus are controlled by means of the same control clock signal.

5. Control module according to claim 1, wherein the control clock signal has a frequency of at least 100 kHz and preferably of at least 500 kHz.

6. Control module according to claim 1, wherein the control module comprises a trigger interface for an external trigger signal, wherein an exposure sequence is executed on each receipt of an external trigger pulse.

7. Control module according to claim 1 wherein the control module comprises an interface for delivering the control clock signal and/or a control signal for controlling the exposure time and/or the illumination time to a further camera.

8. Camera with a digital optical sensor and a control module for controlling the exposure time and for reading out pixels of the digital optical sensor, wherein the control module is designed according to claim 1.

9. Camera according to claim 8, wherein the digital optical sensor is a line sensor.

10. Production system with a conveying device whereby a strip-shaped product or a plurality of products is conveyed on the conveying device, with a camera, according to claim 8 and with an illumination apparatus, wherein the conveying device comprises a trigger signal generator with which an external trigger signal is generated, an external trigger pulse being generated whenever the conveying device has covered a predetermined distance.

11. Production system according to claim 10, wherein the illumination apparatus has light-emitting diodes as illumination means.

12. Method for acquiring images by means of a camera comprising a digital optical sensor for receiving light reflected by an object for a defined exposure time and a control module for controlling the exposure time and reading out pixels of the digital optical sensor, the method comprising executing several exposure sequences repeatedly, each with predetermined different exposure processes, wherein in the exposure processes at least one illumination apparatus for illuminating the object for a defined illumination time and the digital optical sensor are both controlled by means of the control module, wherein the control module is designed to control the illumination time of the at least one illumination apparatus, which is controlled by a switching controller that supplies the illumination apparatus with a predetermined current, and the control module comprises a control clock generator for generating a control clock signal, an interface where the control clock signal is made available for delivery to the switching controller of the illumination apparatus, so that the switching controller is clocked with the control clock signal of the control module and the illumination time can be controlled in synchrony with the control clock signal, and a trigger generator for generating an internal trigger signal, which comprises sequences of several internal trigger pulses, each of which triggers one of the exposure processes of the exposure sequence, the trigger generator being designed such that internal trigger pulses with different spacing can be generated and the control module being a part of the camera and having an interface for transferring the internal trigger signal to the illumination apparatus.

13. Method according to claim 12, wherein the illumination time and the exposure time run in synchrony with one another.

14. Method according to claim 12, wherein both the illumination time and the exposure time are synchronous with the control clock signal.

15. Method according to claim 14, wherein the exposure time and/or the illumination time of at least one of the exposure processes is/are no longer than 20 times an individual cycle of the control clock signal.

16. Method according to claim 12, wherein an exposure sequence is executed whenever an external trigger signal is received.

17. Method according to claim 12, wherein each exposure sequence is executed with predetermined exposure processes of different length, the individual exposure processes starting at irregularly arranged points in time.

18. Control module for a camera and at leak one illumination apparatus controlled by a switching controller, wherein the switching controller supplies the illumination apparatus with a predetermined current and the control module is designed to control the exposure times and to read out pixels of a digital optical sensor of the camera and to control the illumination time of the at least one illumination apparatus and comprises a control clock generator for generating a control clock signal, wherein the control module comprises an interface where the control clock signal is made available for delivery to the switching controller of the illumination apparatus, so that the switching controller is clocked with the control clock signal of the control module and the illumination time can be controlled in synchrony with the control clock signal, the control module being a part of the camera and having an interface for transferring internal trigger signals to the illumination apparatus.

* * * * *

UNITED STATES PATENT AND TRADEMARK OFFICE
CERTIFICATE OF CORRECTION

| | | |
|---|---|---|
| PATENT NO. | : 10,644,410 B2 | |
| APPLICATION NO. | : 15/566345 | |
| DATED | : May 5, 2020 | |
| INVENTOR(S) | : Helmut Sorgius | |

It is certified that error appears in the above-identified patent and that said Letters Patent is hereby corrected as shown below:

In the Claims

Claim 18, Column 14, Line 44, delete "Control module for a camera and at leak one illumi-" and insert --Control module for a camera and at least one illumi- --.

Signed and Sealed this
Sixteenth Day of June, 2020

Andrei Iancu
*Director of the United States Patent and Trademark Office*